Figure 1A:
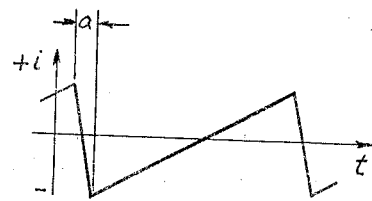

Nov. 11, 1941.  H. BÄHRING  2,262,630
IRON CORE INDUCTANCE
Filed June 23, 1939

INVENTOR
HERBERT BAEHRING
BY
Lippincott & Metcalf
ATTORNEY

Patented Nov. 11, 1941

2,262,630

UNITED STATES PATENT OFFICE 2,262,630

IRON CORE INDUCTANCE

Herbert Bähring, Berlin-Kl. Machnow, Germany, assignor to Fernseh Aktiengesellschaft, Berlin-Zehlendorf, Germany Application June 23, 1939, Serial No. 280,804
In Germany June 27, 1938

8 Claims. (Cl. 250—36)

My invention relates to inductive systems with iron cores, through which non-sinusoidal currents are caused to flow, and particularly to a means for decreasing the voltage insulation problems encountered therein.

Inasmuch as my invention is particularly applicable to oscillator circuits, including an iron core transformer, for generation of sawtooth currents and derivation of a D. C. voltage therefrom, the invention shall be described in connection therewith, bearing in mind that it is in no way limited to such application alone. U. S. Patent 2,051,372, issued August 18, 1936, to Philo T. Farnsworth, and U. S. Patent 2,059,683, issued November 3, 1936, to Philo T. Farnsworth, describe an oscillator circuit including an electron discharge tube and transformer for generation of a sawtooth current flow in an inductive load. The first-named patent also describes a method of producing a D. C. voltage derived from said sawtooth currents by rectification of a portion of the sawtooth current. Furthermore, co-pending U. S. application, Serial No. 254,593, filed February 4, 1939, by Rolf Moller and Herbert Bahring under the title, "Sawtooth wave generator," Patent No. 2,218,764 granted October 22, 1940, discloses a means and method of deriving the filament heating power for a rectifier tube, serving to produce the high D. C. voltage, by means of an auxiliary winding on the aforesaid transformer in the oscillator circuit.

Such circuits include an electron discharge tube having at least a cathode, a control grid and a plate, whereby the primary winding of a transformer with an iron core is connected in the plate circuit, while the secondary winding is connected in the grid circuit. The sawtooth currents produced by such a circuit have a rapid rate of change in one direction and a slow rate of change in the other direction, and the corresponding voltages are alternately high and low. U. S. Patent 2,051,372 shows a method and means for rectifying the so produced high voltages preferably by means of a diode. The magnitude of the generated high voltage is inversely proportional to the time of decay of the sawtooth wave, which in the television art is also commonly referred to as the retrace time. The retrace time in turn decreases with decreasing distributed capacity of the inductive load as well as the transformer windings. This leads to the development of low capacity windings for the transformer. At high voltages this necessitates that the window of the iron core and, therefore, the iron core itself, must be made large in order to prevent arcing over if the iron core is grounded as usual. This measure, however, reacts unfavorably upon the length of the iron path, the inductance per turn, the distributed capacity of the coil, the weight of the iron, the iron losses and the influence of the load upon the generated high voltage.

It is the object of this invention to overcome the aforesaid difficulties; to provide a transformer requiring weaker insulation; to provide a transformer requiring insulation for only one-half the peak voltage occurring; to provide a circuit for decreasing the insulation requirements without affecting the wave shape of the generated sawtooth current. Other features and advantages of my invention will become evident from the following description.

Figure 3:
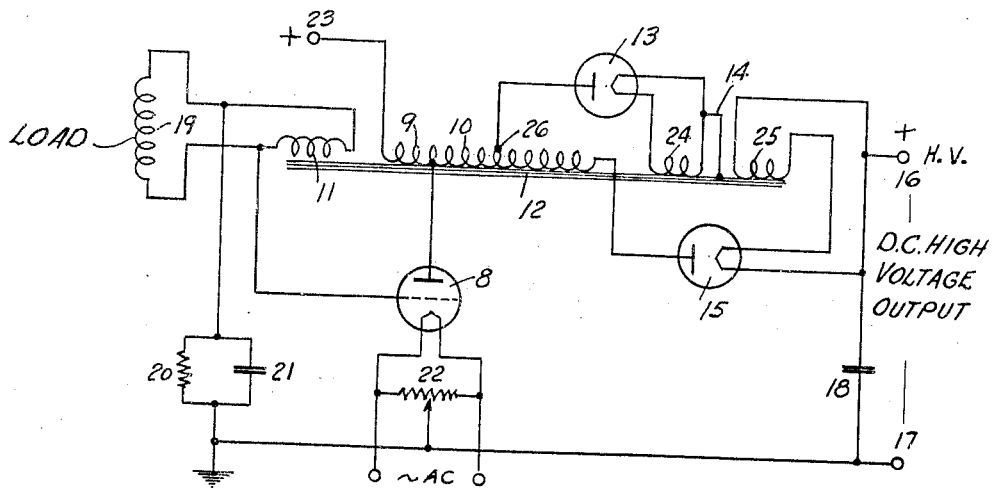

Referring to the drawing:

Figs. 1a and 1b and 2a and 2b aid the explanation of the operation;

While Fig. 3 shows a preferred embodiment of my invention.

Broadly considered, my invention provides for holding the iron core of the transformer carrying plate and grid windings at a steady potential above ground and preferably in the order of one-half the peak-to-peak value of the highest voltage produced by the transformer. For this purpose, I prefer to connect the anode of a diode to the center point of the transformer winding across which the highest voltage is produced and to conductively connect the cathode of said diode to the iron core of the transformer.

Figure 2A:
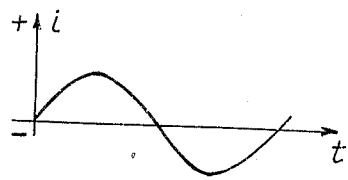
Figure 1B:
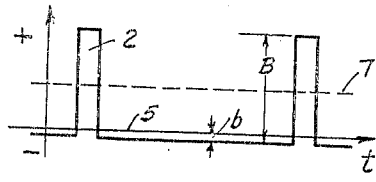
Figure 2B:
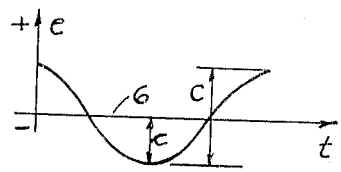

The invention shall now be explained more in detail in connection with the drawing. Fig. 1a shows a sawtooth current with a retrace interval $a$ which, if caused to flow through an inductance, will produce the voltage shown in Fig. 1b. This voltage wave shows peaks 2 occurring during retrace time $a$. It may be seen that this voltage is not symmetrical about the zero line 5 inasmuch as the negative amplitude $b$ is much less than one-half of the peak-to-peak value B. Fig. 2a shows a sinusoidal current which, when caused to flow through an inductance, will produce a sinusoidal voltage as indicated in Fig. 2b, which is symmetrical about zero line 6, whereby the negative portion $c$ is one-half of the peak-to-peak value C. Zero lines 5 and 6 may indicate ground potential at which the iron core in the above-described transformers was held according to usual practice. In accordance with this invention, however, the iron core is to be held at a steady potential above ground, indicated by dotted line 7 in Fig. 1b, which is gained by dividing peak-to-peak value B into two equal parts. Thus, it may be seen that the potential difference between inductance and iron core is the same at maximum negative as well as maximum positive amplitude, while in the case where the iron core was held at zero or ground potential the potential difference at the positive voltage peaks was nearly twice as high. Fig. 2b indicates that elevating the potential of the iron core above ground would be useless for sinusoidal waves inasmuch as, in the same measure as the voltage difference between iron core and transformer winding would be decreased for the positive amplitudes, it would be increased for the negative amplitudes. Thus, the usefulness of my invention in the case of voltage waves which are not symmetrical about a zero line will be readily evident.

Fig. 3 shows an embodiment of my invention in combination with a known means for generating a sawtooth current flow through an inductance, as is described in the above-mentioned U. S. Patents 2,051,372 and 2,059,683, and copending U. S. application, Serial No. 254,593. In Fig. 3, 8 is an oscillator tube possessing a cathode, a control grid and an anode. 9 is the transformer winding connected in the anode circuit of 8, which is connected in series with a voltage step-up winding 10. 11 is a transformer winding connected in the grid circuit of tube 8 in series with an inductive load 19 and a parallel combination of resistance 20 and condenser 21. The junction of windings 9 and 10 is connected with the anode of tube 8, while the free end of 9 is connected to a terminal 23 to which a positive operating potential for the anode of the tube 8 is applied. The free end of voltage step-up winding 10 is connected to the anode of diode 15, the cathode of which is connected to ground and terminal through smoothing condenser 18. The filamentary cathode of 15 is also connected to high voltage output terminal 16 as well as to winding 25 on the transformer which supplies the filament heating power for 15. It may be understood that the filament heating power for 15 may also be derived from a different source. The voltage peaks appearing across the transformer windings 9 and 10 are rectified by means of the diode 15 and a high D. C. output voltage is developed between the terminals 16 and 17. The combination of windings 9 and 10 is divided into equal parts by a center tap 26 which is connected with the anode of a diode 13. The cathode of 13 is conductively connected to the iron core by means of lead 14. The filamentary cathode of 13 is connected with transformer winding 24, by means of which the filament heating power is derived from the transformer. It may be understood that the filament heating power can be derived from a different source. 22 is a hum-balancing potentiometer in the cathode circuit of tube 8.

In operation, the sawtooth current waves are caused to flow through inductive load 19, which may be a set of scanning coils associated with a cathode ray tube. The frequency of the sawtooth current waves is determined by the time constant of the combination of 20 and 21. A voltage will be produced across the series combination of windings 9 and 10 which has the wave shape indicated in Fig. 1b. This voltage is rectified by means of diode 15 and can be used to supply the anode of a cathode ray tube with high voltage. Diode 13 will in the same manner produce a high D. C. voltage; however, of only half magnitude of that produced by diode 15 because its anode is connected to the center tap of windings 9 and 10. This voltage is applied through lead 14 to the transformer core 12 and keeps the latter at a steady potential positive in respect to ground by substantially one-half the positive voltage peak. It may be understood, of course, that the iron core must now also be insulated against parts at ground potential for one-half the high voltage produced by rectifier 15.

If the invention is to be used in combination with the above-described relaxation oscillator and rectifier for generation of high voltage, it is necessary to prevent the voltage between the transformer windings and the core from rising to a value greater than substantially one-half the high voltage when putting the device into operation. For this purpose, the time constant resulting from the combination of the capacity of the transformer core and the inner resistance of diode 13 in non-conductive condition is preferably made equal to or smaller than the time constant resulting from the capacity of smoothing condenser 18 and the interior resistance of high voltage diode 15. In this manner the potential of core 12 is brought to one-half the high voltage before the generated high voltage has reached its stationary value.

While I have described my invention in connection with a relaxation oscillator used to produce sawtooth currents in an inductive deflecting coil, and to produce a high D. C. voltage by rectification of the voltage peaks, I do not wish to be limited to such apparatus inasmuch as my invention is applicable wherever non-sinusoidal current waves not symmetrical about a zero line are caused to flow through an inductance possessing an iron core or wherever voltage peaks occur across such an inductance.

What I claim is:

1. In combination, an inductance element having an iron core, means for causing a flow of non-sinusoidal alternating current through said inductance element to produce a voltage wave across said element, said wave being unsymmetrical about a zero potential line and having excursions of greater amplitude to one side thereof than to the other, and means for maintaining said core at a substantially steady potential with respect to said zero potential line of the same polarity as said excursions of greater amplitude of said voltage wave.

2. In combination, an inductance element having an iron core, means for causing a non-sinusoidal alternating current to flow through said inductance element and producing voltage peaks across said inductance element, means for rectifying a portion of said voltage peaks, and means for applying said rectified voltage to said iron core.

3. In combination, an inductive winding having a center tap and an iron core, means for causing a non-sinusoidal alternating current to flow through said winding to produce voltage peaks across said winding, a diode having an anode and a cathode, means for connecting said center tap to said anode and means for connecting said cathode to said iron core.

4. In combination, a relaxation oscillator including an electron discharge tube having a cathode, a control grid and an anode, an iron core transformer possessing two windings, one of said windings being connected in the anode circuit of said tube, the other of said windings being connected in the grid circuit of said tube, means for supplying D. C. operating potentials to said anode and said cathode and means for maintaining said iron core at a steady potential of a value intermediate said operating potentials of said anode and said cathode.

5. In combination, a relaxation oscillator including an electron discharge tube having a cathode, a control grid and an anode, an iron core transformer possessing two windings, one of said windings being connected in the anode circuit of said tube, the other of said windings being connected in the grid circuit of said tube, and means for maintaining said iron core at a steady potential above ground by substantially one-half of the peak-to-peak value of the A. C. voltage generated by said oscillator.

6. In combination, a relaxation oscillator including an electron discharge tube having a cathode, a control grid and an anode, an iron core transformer possessing two windings, one of said windings being connected in the anode circuit of said tube, the other of said windings being connected in the grid circuit of said tube, said anode winding having a center tap, and a diode having an anode and a cathode, means for connecting the anode of said diode to said center tap, and means for connecting the cathode of said diode to said iron core.

7. In combination, a relaxation oscillator including an electron discharge tube having a cathode, a control grid and an anode, an iron core transformer carrying a first winding connected in the anode circuit of said tube, a second winding for voltage step-up in series with said first winding, and a third winding connected in the grid circuit of said tube, a center tap dividing the series combination of said first and said second windings into equal parts, and a diode having an anode and a cathode, means for connecting the anode of said diode to said center tap and means for connecting the cathode of said diode to said iron core.

8. In combination, an inductance element having an iron core, means for causing a flow of non-sinusoidal alternating current through said inductance element to produce a voltage wave across said element, said wave being unsymmetrical about a zero potential line and having excursions of greater amplitude to one side thereof than to the other, and means for maintaining said core at a substantially steady potential with respect to said zero potential line of such magnitude and polarity that the excursions of said voltage wave to either side of last-named potential are of equal amplitude.

HERBERT BÄHRING.